United States Patent
Kruglick

(10) Patent No.: US 9,602,576 B2
(45) Date of Patent: Mar. 21, 2017

(54) CONTROL REDISTRIBUTION AMONG MULTIPLE DEVICES

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 280 days.

(21) Appl. No.: 14/350,038

(22) PCT Filed: Oct. 16, 2013

(86) PCT No.: PCT/US2013/065151
§ 371 (c)(1),
(2) Date: Apr. 4, 2014

(87) PCT Pub. No.: WO2015/057211
PCT Pub. Date: Apr. 23, 2015

(65) Prior Publication Data
US 2015/0295992 A1    Oct. 15, 2015

(51) Int. Cl.
*G06F 3/0484* (2013.01)
*G06F 3/14* (2006.01)
(Continued)

(52) U.S. Cl.
CPC ........ *H04L 67/025* (2013.01); *G06F 3/04842* (2013.01); *G06F 3/04847* (2013.01); *G06F 3/1454* (2013.01); *G06F 9/4445* (2013.01)

(58) Field of Classification Search
CPC ... G06F 3/1454; G06F 3/04842; H04L 67/025
See application file for complete search history.

(56) References Cited

U.S. PATENT DOCUMENTS

| 7,487,454 B2 | 2/2009 | Czerwinski et al. |
| 8,447,820 B1 * | 5/2013 | Gay ........................ G06Q 10/10 709/206 |

(Continued)

FOREIGN PATENT DOCUMENTS

GB    2405566 A    3/2005

OTHER PUBLICATIONS

Ghafoor, O., "Group cast, How to share your screen using Galaxy S3 and Note Tab 10.1," accessed at http://www.youtube.com/watch?v=lh4QLoW9ivw, published on Nov. 14, 2012, pp. 3.

(Continued)

*Primary Examiner* — Aaron Lowenberger
(74) *Attorney, Agent, or Firm* — Turk IP Law, LLC

(57) ABSTRACT

Technologies are presented for distributing user interface elements and controls among devices. A user may select an element and/or control of a user interface (UI) of a first application displayed on a first device for shifting to one or more other devices. The additional display area at the first device freed up by the shift may be filled with additional application content or UI elements. The shifted element and/or control may remain usable on the one or more other devices the element and/or control shifted to. Overall, a user may be able to remove and redirect application control elements while viewing additional content on the first device in a fast and transparent process.

23 Claims, 7 Drawing Sheets

(51) Int. Cl.
G06F 9/44 (2006.01)
H04L 29/08 (2006.01)

(56) References Cited

U.S. PATENT DOCUMENTS

| | | | |
|---|---|---|---|
| 8,495,244 | B2 | 7/2013 | Bonar et al. |
| 9,130,899 | B1* | 9/2015 | Baird ................. H04L 67/02 |
| 2004/0113948 | A1* | 6/2004 | Shahrbabaki ......... G06F 3/0483 |
| | | | 715/777 |
| 2008/0272889 | A1 | 11/2008 | Symons |
| 2008/0281944 | A1 | 11/2008 | Vorne et al. |
| 2008/0320560 | A1 | 12/2008 | Casey et al. |
| 2009/0006548 | A1 | 1/2009 | Ramanathan et al. |
| 2010/0002122 | A1 | 1/2010 | Larson et al. |
| 2010/0060547 | A1 | 3/2010 | Bloebaum et al. |
| 2011/0029671 | A1 | 2/2011 | Deprun et al. |
| 2011/0113353 | A1* | 5/2011 | Koh ..................... G06F 3/0488 |
| | | | 715/760 |
| 2011/0115737 | A1 | 5/2011 | Fuyuno et al. |
| 2012/0081313 | A1 | 4/2012 | Sirpal et al. |
| 2013/0132885 | A1* | 5/2013 | Maynard ............ G06F 3/04842 |
| | | | 715/777 |
| 2013/0214995 | A1* | 8/2013 | Lewin .................. G06F 3/1446 |
| | | | 345/1.3 |
| 2014/0089508 | A1 | 3/2014 | Hawver et al. |
| 2014/0108486 | A1 | 4/2014 | Borzycki et al. |
| 2014/0129920 | A1* | 5/2014 | Sheretov ........... G06F 17/30873 |
| | | | 715/234 |
| 2014/0280962 | A1 | 9/2014 | Schultz |
| 2016/0065650 | A1 | 3/2016 | Pahwa et al. |
| 2016/0105528 | A1 | 4/2016 | Holmes et al. |

OTHER PUBLICATIONS

Ghafoor, O., "Samsung Galaxy S4 IV: Group Play!," accessed at https://www.youtube.com/watch?v=lxAljg5dfSw, published on May 6, 2013, pp. 2.
"Cross compiling node.js for arm," accessed at http://web.archive.org/web/20130129095036/http://fastr.github.com/articles/cross-compiling-node.js-for-arm.html, Aug. 17, 2010, pp. 1-2.
"Master/slave (technology)," Wikipedia, accessed at en.wikipedia.org/wiki/Master-slave_(technology), last modified on Aug. 10, 2012, pp. 1-2.
"MightyText lets you view and respond to texts from any computer," accessed at http://androidandme.com/2012/06/applications/mightytext-lets-you-view-and-respond-to-texts-from-any-computer/, Jun. 19, 2012, pp. 1-10.
"MouseXP Bluetooth presentation remote control for smartphone," accessed at http://web.archive.org/web/20130720023737/http://www.free-power-point-templates.com/articles/wmousexp-bluetooth-presentation-remote- control-for-smartphone/, accessed on Feb. 25, 2014, pp. 1-6.
"Node Streams: How do they work?," accessed at http://web.archive.org/web/20130517205910/http://maxogden.com/node-streams, accessed on Feb. 25, 2014, pp. 1-4.
"The Top Free Ways to Stream Video From Your Computer to Your Mobile or Tablet," accessed at makeuseof.com/tag/the-top-free-ways-to-stream-video-from-your-computer-to-your-mobile-or-tablet/, Jun. 4, 2012, pp. 1-12.

"Windows SideShow," Wikipedia, accessed at http://web.archive.org/web/20120429182552/http://en.wikipedia.org/wiki/Windows_SideShow, last modified on Apr. 1, 2012, pp. 1-4.
Bandelloni, R., and Paternò, F., "Flexible Interface Migration," In Proceedings of the 9th International Conference on Intelligent User Interfaces, pp. 148-155, ACM, Jan. 2004.
Berti, S., et al., "A Taxonomy for Migratory User Interfaces," Interactive Systems, Design, Specification, and Verification, vol. 3941, pp. 149-160 (2006).
Block, F., et al., "VoodooSketch—Extending Interactive Surfaces with Adaptable Interface Palettes," Proceedings of the Second International Conference on Tangible and Embedded Interaction, pp. 55-58, Feb. 2008.
Hutchings, D.R., and Stasko, J., "Shrinking Window Operations for Expanding Display Space," In Proceedings of the Working Conference on Advanced Visual Interfaces, pp. 350-353, ACM (2004).
James, C., "MS Sideshow Device Free," accessed at https://play.google.com/store/apps/details?id=com.iml.sideshow_free, Nov. 29, 2012, pp. 1-3.
Johanson, B., et al., "PointRight: Experience with Flexible Input Redirection in Interactive Workspaces," in Proceedings of the 15th Annual ACM Symposium on User Interface Software and Technology, pp. 227-234, ACM (2002).
Lockhorn, J., and Schweickhardt, H., "Ubiquitous Computing—Keeping Up With the Digital Consumer," Razorfish5, accessed at http://web.archive.org/web/20130606005106/http://www.razorfish5.com/articles/ubicomp.aspx#01, accessed on Feb. 25, 2014, pp. 1-4.
McElhearn, K., "How to create toolbars for Microsoft Word 2011," accessed at http://web.archive.org/web/20130606033003/http://www.macworld.com/article/1158396/wordtoolbars.html, Mar. 24, 2011, pp. 1-11.
Spindler, M., et al., "Towards making graphical user interface palettes tangible," ACM International Conference on Interactive Tabletops and Surfaces, pp. 291-292, Nov. 2010.
Tan, D.S., "WinCuts: Manipulating Arbitrary Window Regions for More Effective Use of Screen Space," CHI '04 Extended Abstracts on Human Factors in Computing Systems, pp. 4, Apr. 2004.
Uhler, S.A., "MTX-A Shell that Permits Dynamic Rearrangement of Process Connections and Windows," In Proceedings of the Winter 1990 USENIX Conference, pp. 1-10 (1990).
"Chromecast:How to set it up on your tv (walkthrough)," Youtube, accessed at http://www.youtube.com/watch?v=-H6RWzkWVD8, accessed on Feb. 26, 2014, pp. 1-3.
Brownlee, M., "Google Chromecast Review!," Youtube, accessed at http://www.youtube.com/watch?v=TK4u6wm-Hlk, accessed on Feb. 26, 2014, pp. 1-2.
"Samsung SideSync—Phone Screen Share," Youtube, accessed at http://www.youtube.com/watch?v=Jh-ddYqxDac, accessed on Feb. 26, 2014, p. 1-1.
International Search Report with Written Opinion for International Application No. PCT/US2013/065151 mailed on Jan. 29, 2014.
International Search Report with Written Opinion for International Application No. PCT/US2013/047260 mailed on Jan. 22, 2014.
WPXBOX. Bluetooth File Transfer for Windows Phone 8. Dec. 14, 2012 (Dec. 14, 2012) [retrieved on Jan. 6, 2014]. Retrieved from the Internet: <URL:http://www.youtube.com/watch?v=3LPzPiVAROo>. entire document.

* cited by examiner

COMPUTER PROGRAM PRODUCT 700

SIGNAL-BEARING MEDIUM 702

704 AT LEAST ONE OF

ONE OR MORE INSTRUCTIONS FOR DISPLAYING A FIRST USER INTERFACE OF A FIRST APPLICATION ON A FIRST DEVICE;
    ONE OR MORE INSTRUCTIONS FOR RECEIVING A REQUEST TO SHIFT A FIRST PORTION OF THE FIRST USER INTERFACE TO A SECOND DEVICE;
    ONE OR MORE INSTRUCTIONS FOR GENERATING A SECOND USER INTERFACE, THE SECOND USER INTERFACE INCLUDING THE FIRST USER INTERFACE AND AN ADDITIONAL CONTENT;
    ONE OR MORE INSTRUCTIONS FOR DISPLAYING THE FIRST PORTION ON THE SECOND DEVICE; AND
    ONE OR MORE INSTRUCTIONS FOR DISPLAYING A PORTION OF THE SECOND USER INTERFACE ON THE FIRST DEVICE; THE PORTION INCLUDING THE ADDITIONAL CONTENT AND THE FIRST USER INTERFACE BUT EXCLUDES THE FIRST PORTION.

| COMPUTER-READABLE MEDIUM 706 | RECORDABLE MEDIUM 708 | COMMUNICATIONS MEDIUM 710 |
|---|---|---|

FIG. 7

CONTROL REDISTRIBUTION AMONG MULTIPLE DEVICES

CROSS-REFERENCE TO RELATED APPLICATION

This Application is the U.S. National Stage filing under 35 U.S.C. §371 of PCT Application Ser. No. PCT/US2013/065151 filed on Oct. 16, 2013. The PCT application is hereby incorporated by reference in its entirety.

BACKGROUND

Unless otherwise indicated herein, the materials described in this section are not prior art to the claims in this application and are not admitted to be prior art by inclusion in this section.

Ubiquitous computing (ubicomp) refers to a modern model of human-computer interaction, in which users may frequently be operating one or more computational devices and/or systems. Ubiquitous technology may often be wireless, mobile, and networked allowing users to connect between their own devices and with other users' devices, with the ultimate goal of making technology ubiquitous through integration and application in everyday life.

Modern ubicomp usage may include both a surplus and a shortage of screen space. For example, a user may have multiple devices such as a tablet, music player, laptop, and smart phone with individual displays. Thus, while the user may have abundant total display area among their various devices, individual displays may be limited for specific application user interfaces. At the same time, any given application may be limited to one of those screens. For example, there may not be an easy way to remove the menus from the top of an editing window on a laptop and put those menus on a smartphone screen associated with the same user. If such movements are possible, applications may use the sum of available screen space instead of whichever single screen they may be attached to. Users may then turn their handheld devices into handy control pads to run other applications while maximizing viewing area.

SUMMARY

The present disclosure generally describes techniques for distributing user interface content among devices.

According to some examples, a method is provided to shift a portion of a user interface from one computing device to another computing device. The method may include displaying a first user interface (UI) of a first application on a first device, receiving a request to shift the first portion of the first UI to a second device, and generating a second UI including the first UI and an additional content. The method may further include displaying the first portion on the second device and displaying a portion of the second UI on the first device, where the portion of the second UI includes the additional content and the first UI but excludes the first portion of the first UI.

According to other examples, a computing device is provided to shift a portion of a user interface from one computing device to another computing device. The computing device may include a memory configured to store instructions, a communication module, and a processor coupled to the memory and the communication module, the processor operable to execute a control manager. The control manager may be configured to cause a first device to display a first user interface (UI) of a first application, receive a request to shift a first portion of the first UI to a second device, and generate a second UI including the first UI and an additional content. The control manager may also be configured to cause the second device to display the first portion and cause the first device to display a portion of the second UI, where the portion of the second UI includes the additional content and the first UI but excludes the first portion of the first UI.

According to further examples, a control manager module is provided to shift a portion of a user interface from one computing device to another computing device. The control manager module may include an element-selection module, an element-shifting module, and a processing module. The element-selection module may be configured to receive a request to shift a first portion of a first user interface (UI) of a first application from a first device to a second device. The element-shifting module may be configured to cause the second device to display the first portion. The processing module may be configured to cause the first device to display the first UI, generate a second UI including the first UI and an additional content, and cause the first device to display a portion of the second UI, where the portion of the second UI includes the additional content and the first UI but excludes the first portion of the first UI.

According to some examples, a computer readable medium may store instructions for distributing user interface elements among devices, which when executed on one or more computing devices may execute a method to shift a portion of a user interface from one computing device to another computing device. The methods may be similar to the methods described above.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 7 illustrates a block diagram of an example computer program product, all arranged in accordance with at least some embodiments described herein.

DETAILED DESCRIPTION

Figure 1:
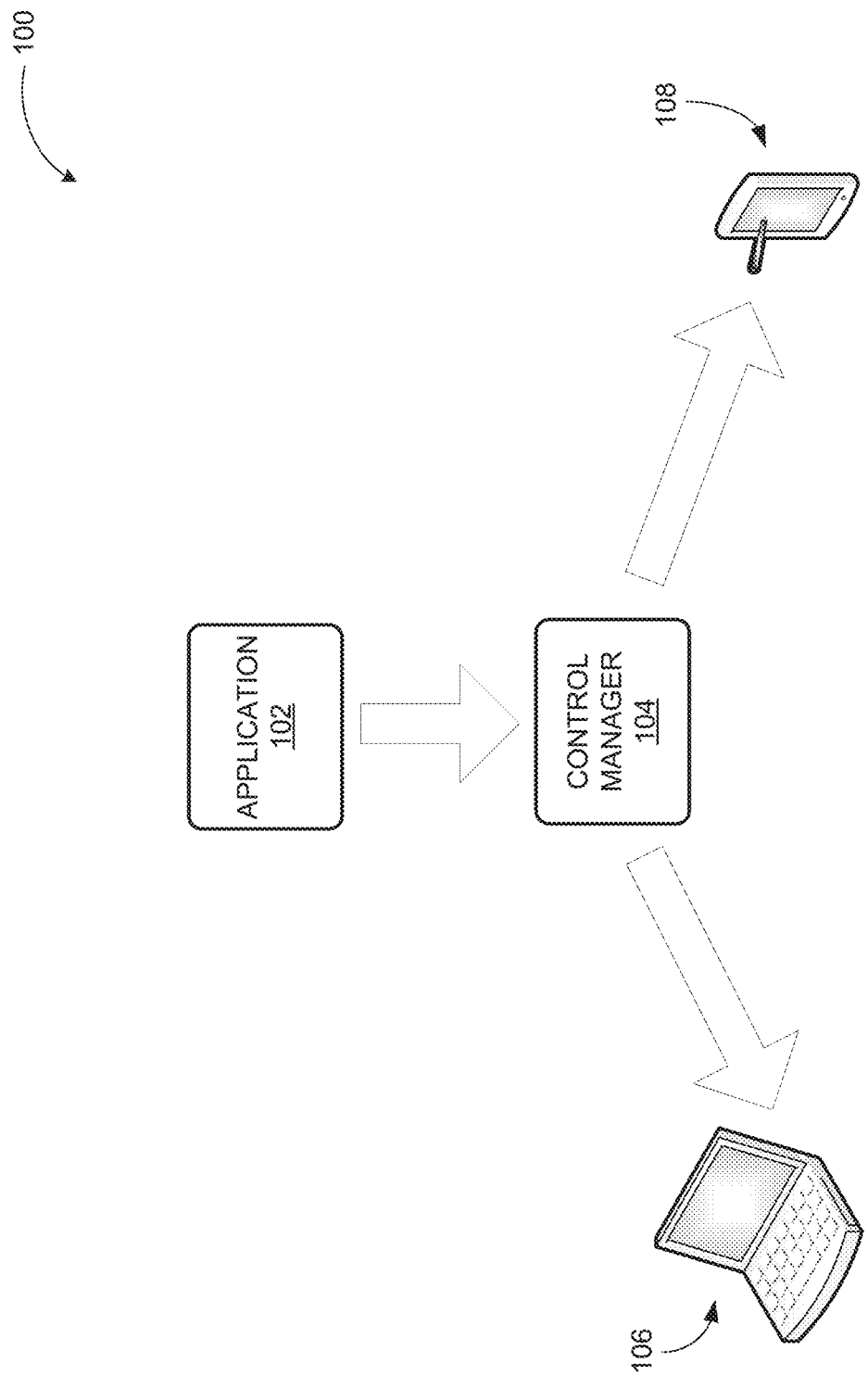
FIG. 1 illustrates an example system for distributing content among devices.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to control and other user interface element redistribution among multiple devices.

Briefly stated, technologies are generally described to distribute user interface elements and controls among devices. According to some embodiments, a user may select an element and/or control of a user interface (UI) of a first application displayed on a first device for shifting to one or more other devices. The additional display area at the first device freed up by the shift may be filled with additional application content or UI elements. The shifted element and/or control may remain usable on the one or more other devices the element and/or control shifted to. Overall, a user may be able to remove and redirect application control elements while viewing additional content on the first device in a fast and transparent process.

FIG. 1 illustrates an example system for distributing content among devices, arranged in accordance with at least some embodiments described herein.

As shown in a diagram 100, an application 102 may provide application content to be displayed at a first device 106 and a second device 108. The application 102 may be located and/or executed at the first device 106 or the second device 108 (e.g., in local memory), or at a remote location (e.g., on a network or at a remote datacenter). The provided application content may be in the form of application user interface elements, data, or any other suitable content, and may include textual, graphical, audio-visual, or any other type of data suitable for display at the first device 106 and/or the second device 108.

In some embodiments, the application 102 provides the application content to be displayed at the first device 106 and/or the second device 108 via a control manager 104. The control manager 104 may execute at the first device 106, the second device 108, or a remote location, and may execute as a standalone application or module or be embedded into the operating system of one of the devices. The control manager 104 may be configured to distribute the application content received from the application 102 to the first device 106 and/or the second device 108 for display, as described below.

The first device 106 and/or the second device 108 may include any device capable of displaying the application content provided by the application 102. For example, the first device 106 may include a desktop computer, a monitor, a projector, a television, or any other relatively stationary content-displaying device. The second device 108 may include a laptop computer, a tablet computer, a mobile computer, a handheld computer, a smartphone, a personal digital assistant, a wearable computer, or any other suitable mobile computing device. In some embodiments, the first device 106 may also include a mobile computing device, and the second device 108 may also include a relatively stationary display device.

Figure 2:
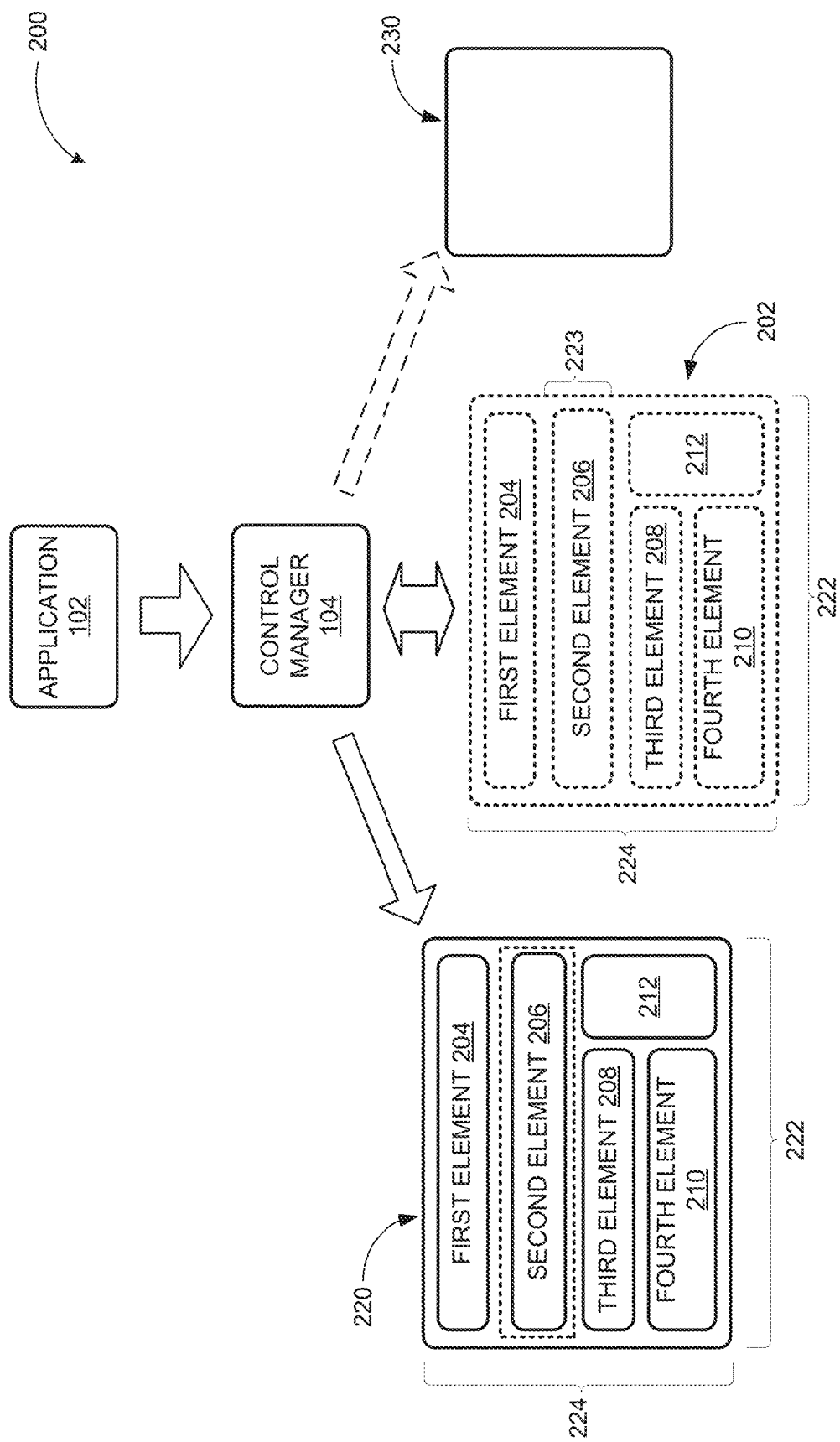
FIG. 2 illustrates the selection of displayed user interface elements on a first device for shifting to a second device.

FIG. 2 illustrates the selection of displayed user interface elements on a first device for shifting to a second device, arranged in accordance with at least some embodiments described herein.

As described above, the control manager 104 may receive application content from the application 102 and provide the application content to the first device 106 and/or the second device 108 for display. For example, the control manager 104 may provide user interface (UI) elements, such as application controls and/or application content, to the first device 106 and/or the second device 108. Each of the devices may have an associated display for displaying application content. For example, the first device 106 may have or be associated with a display 220 and the second device 108 may have or be associated with a display 230. When the control manager 104 provides application content to the first device 106 for display on the display 220, the control manager 104 may first determine a desired application display size for the display 220. For example, the desired display size may be the maximum content display size for the display 220 or may be the size of a user-defined window on the display 220. In the diagram 200, the desired display size has a height 224 and a width 222.

The control manager 104 may then generate a simulated application by directing the application to render to a hidden or off-screen display area. According to other examples, the application may be running in a virtual machine (VM) and the simulated application may be the display output of the VM, which is received by the control manager 104. The simulated application version 202 may be generated based on the determined desired application display size, the received content, and/or other formatting parameters. For example, the size of the simulated application version 202 may be based on the desired application display size. In the diagram 200, the size of the simulated application version 202 may be selected to be the same as the desired application display size (height 224 and width 222). The particular application content to be included in the simulated application version 202 may then be selected from the received application content based on the size of the simulated application version 202. For example, the control manager 104 may select a first UI element 204, a second element 206, a third UI element 208, a fourth UI element 210, and a fifth UI element 212 to include in the simulated application version 202.

Subsequently, the control manager 104 may provide at least a portion of the simulated application version 202 for display on the display 220. For example, since the dimensions of the simulated application version 202 is the same as the desired application display size, the control manager 104 may provide the entire simulated application version 202 for display on the display 220. In some embodiments, the control manager 104 may itself render the simulated application version 202 and then provide the rendered application content for display on the display 220.

In some embodiments, a user of the first device 106 viewing the application content on the display 220 may wish to shift one or more portions of the application content to the second device 108. For example, the user may wish to shift one or more application controls displayed on the display 220 to the second device 108. In this situation, the user may select the portion(s) of the application content displayed on the display 220 by indicating particular portions of the displayed content using a device interface such as a keyboard, mouse, touchscreen, or any other suitable selection interface. For example, the user may indicate portions of displayed content corresponding to particular rows or columns of pixels on the display 220, or corresponding to intersections of particular rows and columns of pixels (i.e., content portions that do not span the entire height or width of the content). In the diagram 200, the user may select the second UI element 206 to be shifted, as indicated by its dashed outline. Subsequently, the selected application content may be shifted to the second device 108, as described below in FIG. 3.

Figure 3:
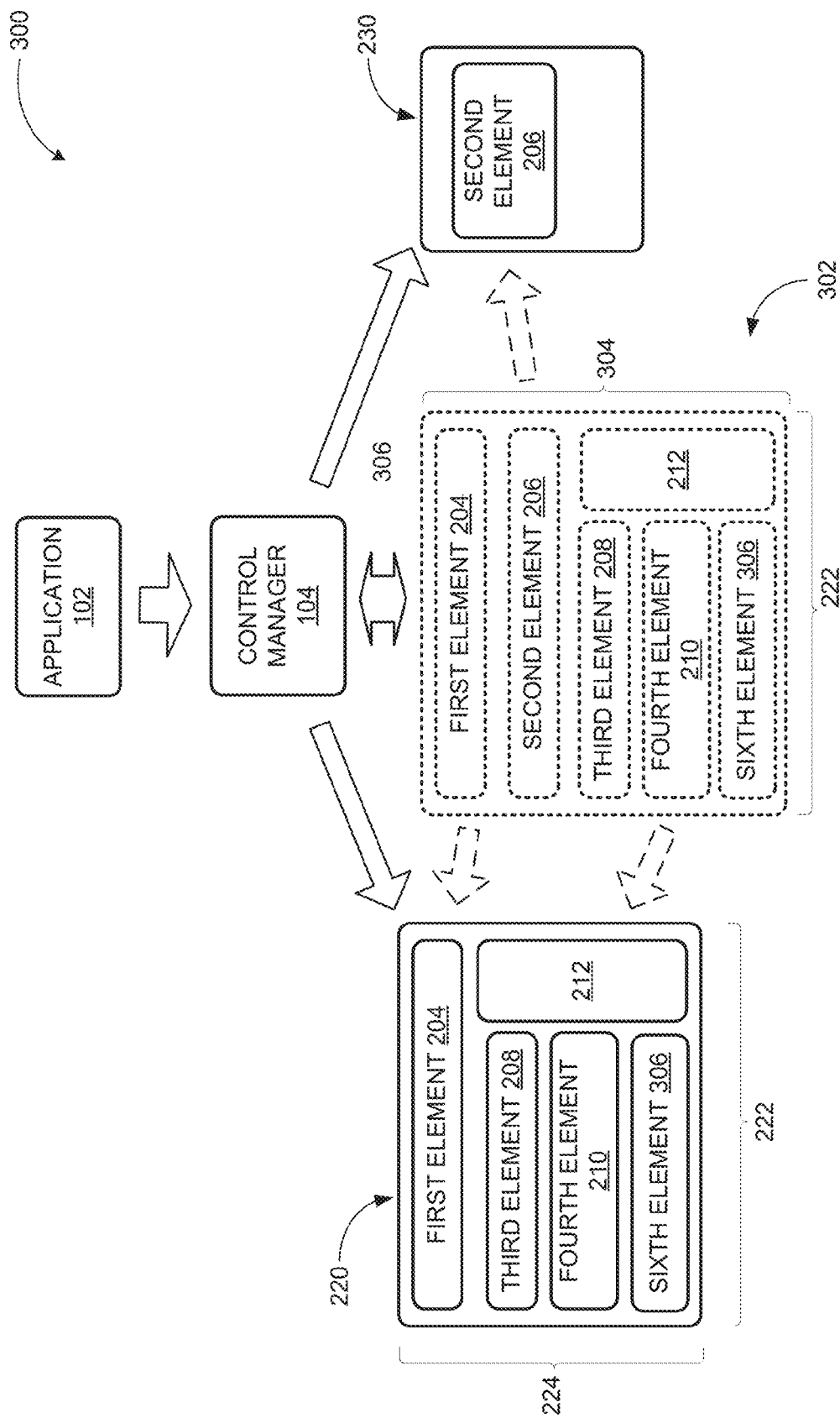
FIG. 3 illustrates the display of additional user interface elements on a first device after selected content elements have been shifted to a second device.

FIG. 3 illustrates the display of additional user interface elements on a first device after selected content elements have been shifted to a second device, arranged in accordance with at least some embodiments described herein.

FIG. 3 depicts a diagram 300 that is similar to the diagram 200, with similarly-numbered elements behaving similarly. In the diagram 300, the control manager 104 may have received the request to shift a user-selected application content portion (the second UI element 206). The control manager 104 may implement the content shifting by changing the dimensions of simulated application version 302 and adjusting the application content provided from the simulated application version 302 to the first device 106 and the second device 108. In some embodiments, the control manager 104 may generate the simulated application version 302 to include additional application content to take advantage of the display area freed up by the removal of the user-selected application content portion from the display 220. For example, upon receiving the request to shift the second UI element 206, the control manager 104 may determine the size of the second element 206, which may correspond to the display area freed up on the display 220 when the second element 206 is removed. In some embodiments, instead of selecting a particular element to shift, a user may select particular rows, columns, or portions of display pixels to shift, as described above. The control manager 104 may then generate the simulated application version 302 to be larger than the previous simulated application version 202 by the size of the shifted application content portion and to include additional application content to fill up the newly available display area. For example, the second element 206 may be sized with width 222 and height 223. The control manager 104 may then generate the simulated application version 302 with the same width 222, but with a height 304 larger than the height 224 (of the simulated application version 202) by the height 223 of the second element 206. The control manager 104 may then populate the newly available area with a sixth element 306, as well as adding content to the fifth element 212.

Subsequently, the control manager 104 may provide a portion of the simulated application version to the first device 106 for display on the display 220. Specifically, the control manager 104 may provide the first element 204, the third through sixth elements 208, 210, 212, and 306, respectively to the first device 106, but refrain from providing the second element 206. In some embodiments, the control manager 104 may first render the entirety of the simulated application version 302 at the control manager 104. The control manager 104 may then provide the rendered content excluding the second element 206 (e.g., the first element 204, the third, fourth, fifth, and sixth elements 208, 210, 212, and 306, respectively) for display on the display 220. As a result, the display 220 may no longer display the second element 206, even though the underlying simulated application version 302 may still include the second element 206. The display area freed up by the removal of the second element 206 may then be occupied by the newly provided sixth element 306 and the larger fifth element 212.

The control manager 104 may then separately provide the second element 206 in the simulated application version 302 to the second device 108 for display on the display 230. For example, as described above, the control manager 104 may render the simulated application version 302 then provide the rendered second element 206 from the rendered application version 302 to the second device 108 for display on the display 230. The control manager 104 may provide the second element 206 to the second device 108 in a number of ways. For example, the control manager 104 may provide the second element 206 to the second device 108 as an image file (e.g., a PNG, JPEG, TIFF, GIF, BMP, or similar file), a hypertext markup language (HTML) or extensible markup language (XML) file, a served web page, content in an application, or any other suitable format. The control manager 104 may provide the second element 206 via a uniform resource locator (URL) link to a network location, which the second device 108 may then access. In some embodiments, the control manager 104 may provide access to second element 206 to the second device 108 using near-field communications (NFC). For example, if both the first device 106 and the second device 108 are NFC-capable, a user may be able to "bump" the two devices together to shift the second element 206 from the first device 106 to the second device 108. In some embodiments, the control manager 104 may use an optically-readable code such as a quick response (QR) code that the second device 108 can read to access the second element 206.

Message based control events that allow the control of content displayed at a remote device may be employed to shift the selected application content according to some embodiments. For example, a program may be used to capture user actions (e.g., mouse clicks or touches) in a particular display area on one device and copy them to the equivalent location on the second device. For example, a click input on second element 206 on device 230 may be delivered to control manager 104. At control manager 104, the input on coordinates of element 206 may be converted to the equivalent coordinates clicking the equivalent portion of second element 206 in simulated application 302 and applied by control manager 104. Thus, the simulated application 302 may receive inputs from both display 220 and 230, with each input being relayed to the equivalent portion of simulated application 302.

In some embodiments, the display area freed up by the removal of a content portion may not be positioned at the same location as the original content portion. For example, the second element 206 may originally occupy a position directly below the first element 204, but the display area freed up by the removal of the second element 206 may be taken up by the fourth element 210 and the fifth element 212. This may occur because although the application content displayed at the display 220 excludes the second element 206, the second element 206 in actuality is still present in the simulated application version 302 that supplies the application content.

Similarly, while in the description above the control manager 104 adds the sixth element 306 and additional content for the larger fifth element 212, in other embodiments more elements may be added, or other, pre-existing elements may be resized to be larger, smaller, include more content, or include less content. In some embodiments, the user-selected element to be shifted (the second element 206) may be shifted to any other available device (not just the second device 108), and may also be displayed on multiple other devices.

Figure 4:
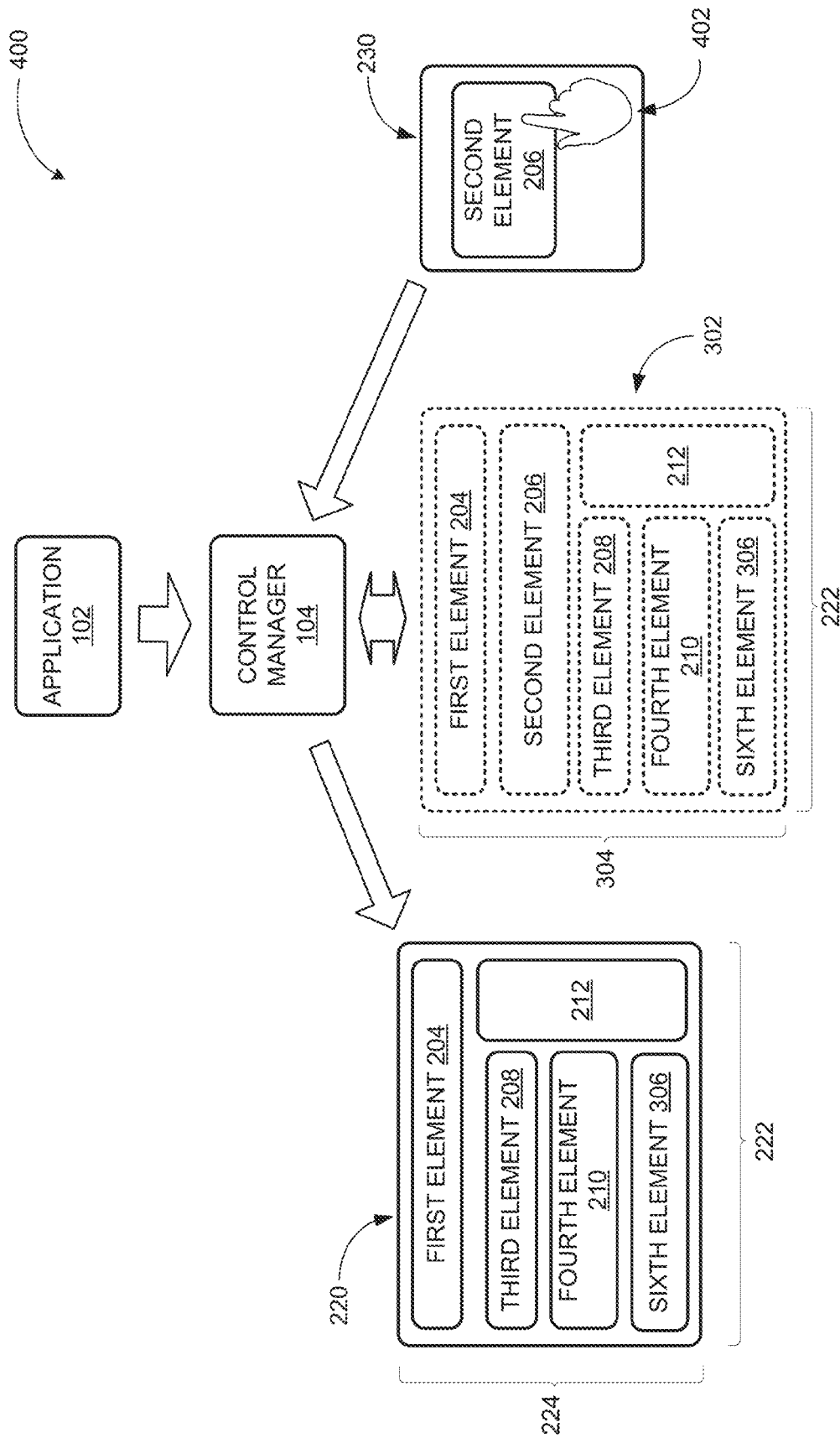
FIG. 4 illustrates the coordination of input(s) at a second device with a first device.

FIG. 4 illustrates the coordination of input(s) at a second device with a first device, arranged in accordance with at least some embodiments described herein.

FIG. 4 depicts a diagram 400 that is similar to the diagram 300, with similarly-numbered elements behaving similarly. In the diagram 400, the second element 206 may have been shifted from the first device 106 (and the display 220) to the second device 108 (and the display 230), as described above. In some embodiments, the second element 206 may include one or more controls. For example, the second UI element 206 may include a row of buttons, a menu column, a tool window, and/or any other suitable control. When a user actuates the control(s) in the second element 206 to provide an input 402, the second device 108 may provide the input 402 to the control manager 104. The control manager 104 may then provide the input 402 to the application 102 for processing.

In some embodiments, the control manager 104 may map the location of the input 402 captured at the second element 206 displayed at the second device 108 to the corresponding location in the second element 206 in the simulated application version 302. For example, the location of the input 402 may be denoted by coordinates (e.g., horizontal and vertical coordinates) based on the size of the display 230. This location information may be conveyed to the control manager 104, which may translate the location information to the coordinates of the corresponding location of the input 402 at second element 206 in the simulated application version 302. Subsequently, the control manager 104 may provide the input 402 and its coordinates in the simulated application version 302 to the application 102 for further processing. As a result, the shifting of the second element 206 and its included controls to the second device 108 may be transparent to the application 102.

While the input 402 described above is associated with the second element 206 displayed on the second device 108, the control manager 104 may also process inputs associated with the first device 106 (and the display 220) similarly. For example, any input associated with the user interface elements displayed on the display 220 may have location information in the form of coordinates, which may be based on the size of the display 220. When the input location information is provided to the control manager 104, the control manager 104 may translate the coordinates associated with the display 220 to coordinates of the corresponding input location in the simulated application version 302. Subsequently, the control manager 104 may provide the input and its coordinates in the simulated application version 302 to the application for processing.

In some embodiments, inputs at the first device 106 and the second device 108 may be delivered to the control manager 104 as messages. Message delivery may be accomplished in a number of ways. One technique may include using a software platform that enables event-driven input/output. Such software platforms may allow the use of stream instances, which may be operating system pipes that may be readable, writable, and/or both. A readable stream may emit data events each time a chunk of data is received and an end message when the stream completes. Input messages may be transferred as API calls, stream elements, or other forms of network messages.

Once application inputs and outputs have been connected to stream instances, existing libraries may be used to route streams to different destinations (i.e., target devices) using various servers, intermediaries, buffers, and/or conversions. For script-based operating systems, the control inputs may be implemented as streams, thus allowing browser or application manipulations to send control signals to any desired destination. Embodiments may also be integrated into a mobile operating system such that each control may be implemented as a writeable stream to the application and a readable stream from the interface object. As a result, any platform anywhere on a network may be able to exert control, and as long as each progressive movement involves the issuance of a stream forwarder, the entire system may be transparent to both the user and the source application.

In other embodiments, at least part of the user interface shifting process may occur via a central server. For example, a user may have a home or cloud network address that may be set as a default to receive any selected user interface and/o controls and allow users to retrieve them on a device of their choosing. The shifting process may also happen through intercept by a gateway. In some examples, a "clipping tool" may be provided to allow users to select an application portion (which may or may not include controls) on one device and then indicate another device to transfer the selected portion of the UI. The user may configure his/her clipping tool with an address or identifier for the device displaying the original selected application portion and any time he/she snips a portion of the application, his/her other devices may see them in a menu to pull from the first device 106.

The user interface portion and/or an application whose user interface is to be shifted may be selected by the user or selected automatically based on default or custom user preferences (e.g., particular controls, a top row of the user interface, etc.). The device(s) to receive the selected user interface portion may also be selected by the user or automatically by the control manager 104 based on user preferences or system parameters (e.g., a service provider may automatically configure selected user interface portions to be shifted to a user's smart phone from their tablet or vice versa). In other examples, the selected user interface portion may be made available to any device through a URL or similar technique and pulled by the device through user action.

Figure 5:
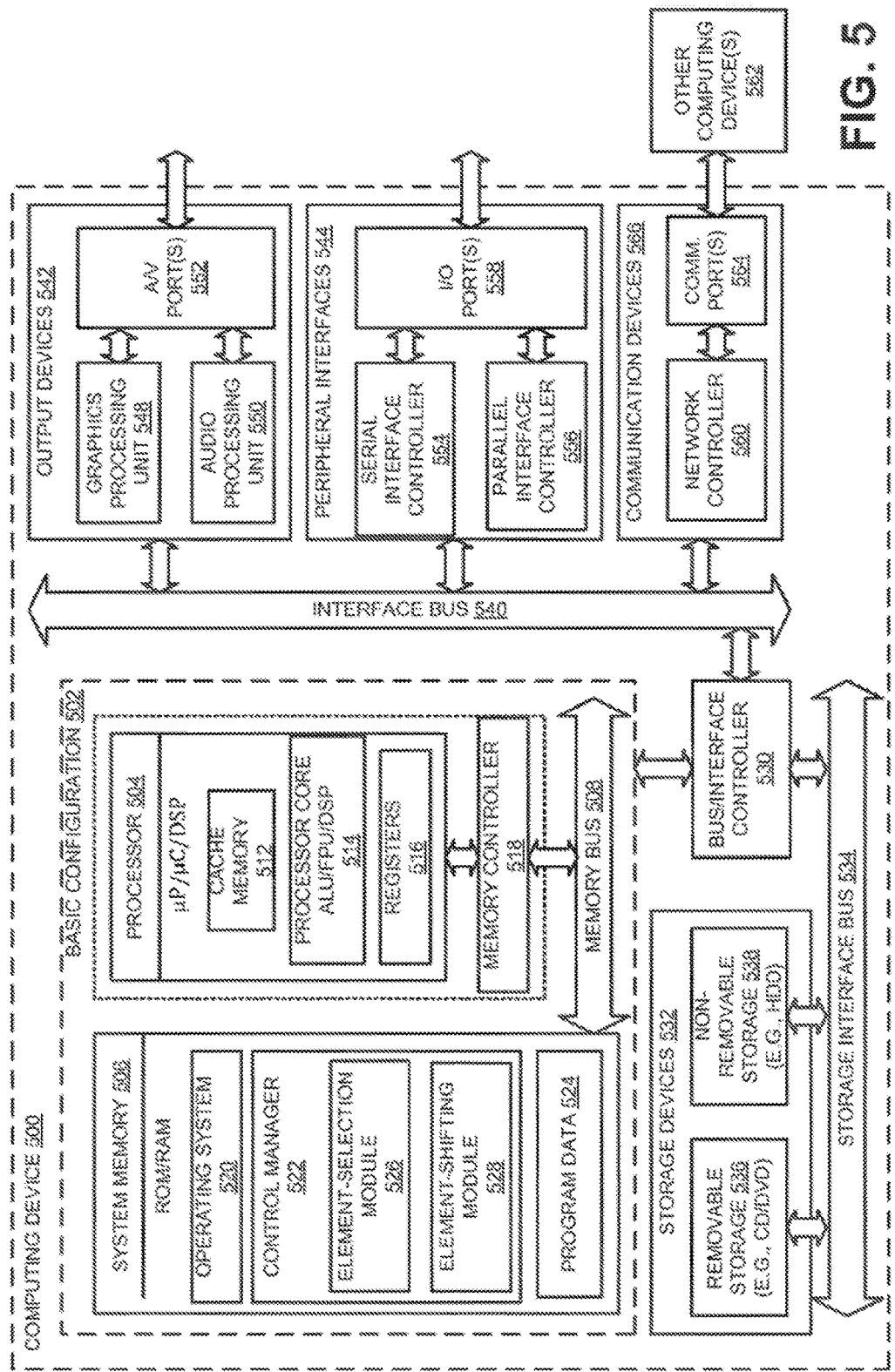
FIG. 5 illustrates a general purpose computing device, which may be used to shift user interface control elements among devices.

FIG. 5 illustrates a general purpose computing device, which may be used to shift user interface control elements among devices, arranged in accordance with at least some embodiments described herein.

For example, the computing device 500 may be used to shift user interface control elements among devices as described herein. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations, the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, a control manager 522, and program data 524. The control manager 522 may include an element-selection module 526 to identify portions of displayed content to be shifted and an element-shifting module 528 to capture, remove, and shift the identified portions of displayed content as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 566) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices e.g., printer, scanner, etc.) via one or more I/O ports 558. An example communication device 566 includes a network controller 560, which may be arranged to facilitate communications with one or more other computing devices 562 over a network communication link via one or more communication ports 564. The one or more other computing devices 562 may include servers at a datacenter, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods for distributing user interface control elements among devices. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be with a machine that performs a portion of the program. In other examples, the human interaction can be automated such as by pre-selected criteria that may be machine automated.

Figure 6:
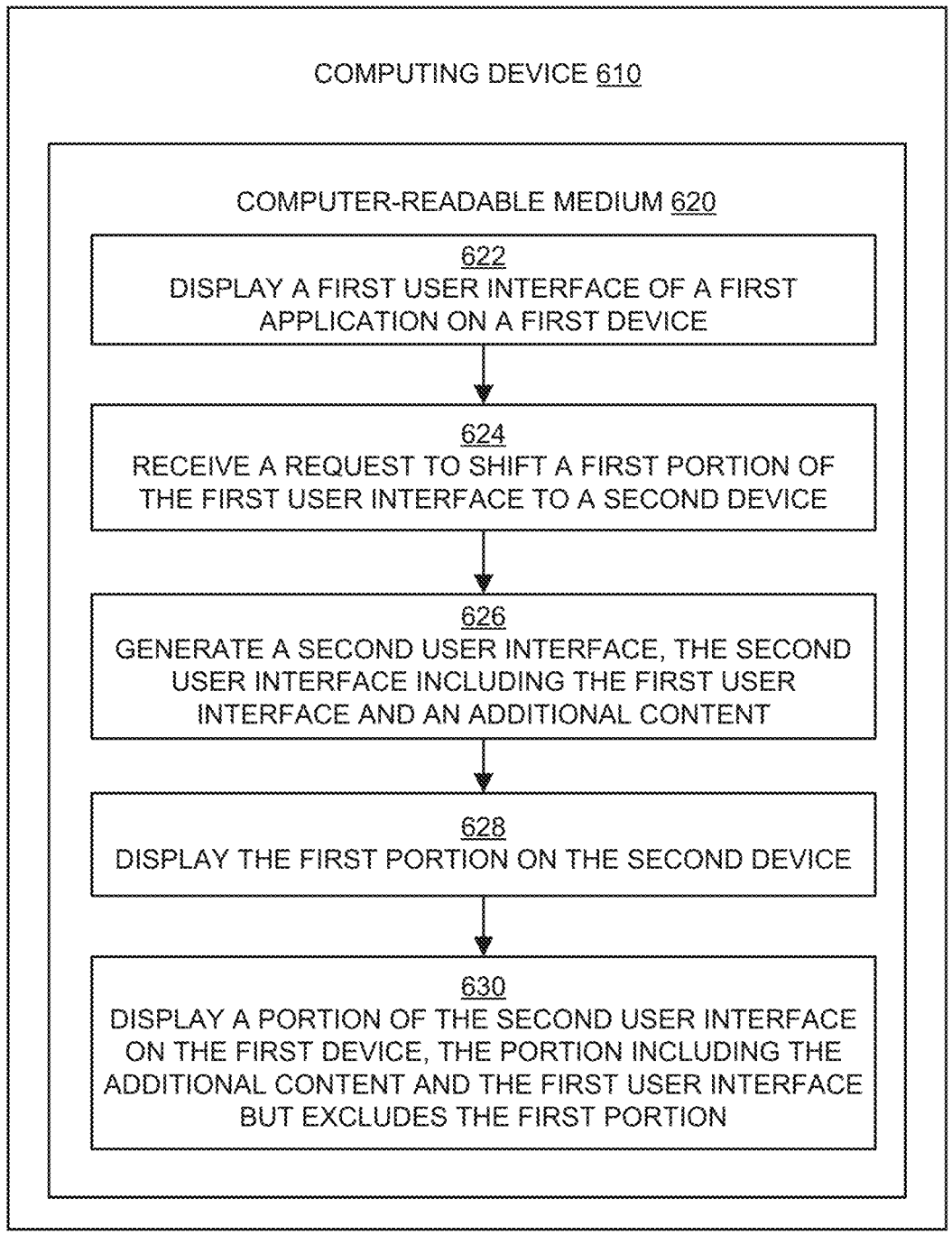
FIG. 6 is a flow diagram illustrating an example method for distributing user interface control elements among devices that may be performed by a computing device such as the computing device in FIG. 5.

FIG. 6 is a flow diagram illustrating an example method for distributing user interface control elements among devices that may be performed by a computing device such as the computing device in FIG. 5, arranged in accordance with at least some embodiments described herein.

Example methods may include one or more operations, functions or actions as illustrated by one or more of blocks 622, 624, 626, 628 and/or 630, and may in some embodiments be performed by a computing device such as the computing device 500 in FIG. 5. The operations described in the blocks 622-630 may also be stored as computer-executable instructions in a computer-readable medium such as a computer-readable medium 620 of a computing device 610.

An example process for distributing user interface control elements may begin with block 622, "DISPLAY A FIRST USER INTERFACE OF A FIRST APPLICATION ON A FIRST DEVICE", where a control manager (e.g., the control manager 104) may provide application user interface content received from an application (e.g., the application 102) to a first device (e.g., the first device 106) for display on a device display (e.g., the display 220).

Block 622 may be followed by block 624, "RECEIVE A REQUEST TO SHIFT A FIRST PORTION OF THE FIRST USER INTERFACE TO A SECOND DEVICE", where the control manager 104 may receive a user request to shift a selected portion of the application user interface content displayed at the first device 106 to a second device (e.g., the second device 108). For example, the content portion may be selected by selecting one or more rows of pixels, columns of pixels, and/or intersections of pixel rows and columns. The content portion may also (or instead) be identified automatically.

Block 624 may be followed by block 626, "GENERATE A SECOND USER INTERFACE, THE SECOND USER INTERFACE INCLUDING THE FIRST USER INTERFACE AND AN ADDITIONAL CONTENT", where the control manager 104 may generate another version of the application user interface including the original user interface and additional content based on the received user shift request. For example, the control manager 104 may determine the amount of display area at the first device 106 freed up by the shift of the selected content portion based on the size of the selected content portion. The control manager 104 may then include additional application content or user interface elements to fill the freed-up display area. In some embodiments, the control manager 104 may also (or instead) resize application content that already existed in the first version of the application user interface.

Block 626 may be followed by block 628, "DISPLAY THE FIRST PORTION ON THE SECOND DEVICE", where the control manager 104 may send the selected content portion to the second device 108 for display on its display (e.g., the display 230).

Block 628 may be followed by block 630, "DISPLAY A PORTION OF THE SECOND USER INTERFACE ON THE FIRST DEVICE, THE PORTION INCLUDING THE ADDITIONAL CONTENT AND EXCLUDING THE FIRST PORTION", where the control manager 104 may sent the second version of the application user interface, excluding the first portion shifted to the second device 108, to the first device 106 for display. In particular, the control manager may send the additional or resized application content or user interface elements to the first device 106, but may refrain from providing the first portion to the first device 106, even though the first portion is still included in the second version of the application user interface.

FIG. 7 illustrates a block diagram of an example computer program product, arranged in accordance with at least some embodiments described herein.

In some examples, as shown in FIG. 7, the computer program product 700 may include a signal bearing medium 702 that may also include one or more machine readable instructions 704 that, when executed by, for example, a processor may provide the functionality described herein. Thus, for example, referring to the processor 504 in FIG. 5, the control manager 522, the element-selection module 526, or the element-shifting module 528 may undertake one or more of the tasks shown in FIG. 7 in response to the instructions 704 conveyed to the processor 504 by the signal bearing medium 702 to perform actions associated with distributing user interface control elements among devices described herein. Some of those instructions may include, for example, displaying a first user interface of a first application on a first device, receiving a request to shift a first portion of the first user interface to a second device, generating a second user interface, the second user interface including the first user interface and an additional content, displaying the first portion on the second device, and/or displaying a portion of the second user interface on the first device, where the displayed portion includes the additional content and the first user interface but excludes the first portion, according to some embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the computer program product 700 may be conveyed to one or more modules of the processor 704 by an RF signal bearing medium, where the signal bearing medium 702 is conveyed by the wireless communications medium 710 (e.g., a wireless communications medium conforming with the IEEE 802.11 standard).

According to some examples, a method is provided to shift a portion of a user interface from one computing device to another computing device. The method may include displaying a first user interface (UI) of a first application on a first device, receiving a request to shift the first portion of the first UI to a second device, and generating a second UI including the first UI and an additional content. The method may further include displaying the first portion on the second device and displaying a portion of the second UI on the first device, where the portion of the second UI includes the additional content and the first UI but excludes the first portion of the first UI.

According to some embodiments, receiving the request may include receiving a selection of one or more rows, one or more columns, an intersection of one or more rows and columns, and/or multiple pixels on the first UI of the first application corresponding to the first portion. A size of the first UI may be preserved when the portion of the second UI is displayed on the first device. A size of the first UI may also be reduced when the portion of the second UI is displayed on the first device. The first portion may be provided to the second device in an image format.

According to other embodiments, the method may further include capturing an input associated with the first portion and conveying the captured input to the first application for processing. The first portion of the first UI may include one or more control elements and the captured input may be associated with one of the one or more control elements. The method may further include executing a simulated instance of the first application and delivering the captured input as a message to the simulated instance of the first application. The message may be received in a readable stream that emits data events associated with the second device.

According to further embodiments, the method may further include implementing one or more controls within the first portion as a writeable stream to the second device and a readable stream from an interface object. The method may also include composing a link for one or more controls on the first UI and providing the link to the second device for displaying the one or more controls, e.g., as a web page. The link may be provided to the second device via near field communication (NFC) or an optically machine-readable code. The first and second device may be a smartphone, a tablet computer, a laptop computer, a mobile computer, a handheld computer, a desktop computer, and/or a wearable computer. A control manager for receiving the request and generating the second UI may be implemented on the first device, the second device, or a server communicatively coupled to the first and second devices.

According to other examples, a computing device is provided to shift a portion of a user interface from one computing device to another computing device. The computing device may include a memory configured to store instructions, a communication module, and a processor coupled to the memory and the communication module, the processor operable to execute a control manager. The control manager may be configured to cause a first device to display a first user interface (UI) of a first application, receive a request to shift a first portion of the first UI to a second device, and generate a second UI including the first UI and an additional content. The control manager may also be configured to cause the second device to display the first portion and cause the first device to display a portion of the second UI, where the portion of the second UI includes the additional content and the first UI but excludes the first portion of the first UI.

According to some embodiments, the control manager may be configured to receive the request by receiving a selection of one or more rows, one or more columns, an intersection of one or more rows and columns, and/or multiple pixels on the first UI of the first application corresponding to the first portion. A size of the first UI may be preserved when the portion of the second UI is displayed on the first device. A size of the first UI may also be reduced when the portion of the second UI is displayed on the first device. The first portion may be provided to the second device in an image format.

According to other embodiments, the control manager may be further configured to capture an input associated with the first portion and convey the captured input to the first application for processing. The first portion of the first UI may include one or more control elements and the captured input may be associated with one of the one or more control elements. The control manager may be further configured to execute a simulated instance of the first application and deliver the captured input as a message to the simulated instance of the first application. The message may be received in a readable stream that emits data events associated with the second device.

According to further embodiments, the control manager may be further configured to implement one or more controls within the first portion as a writeable stream to the second device and a readable stream from an interface object. The control manager may also be configured to compose a link for one or more controls on the first UI and provide the link to the second device for displaying the one or more controls as a web page. The link may be provided to the second device via near field communication (NFC) or an optically machine-readable code. The first and second device may be a smartphone, tablet computer, a laptop computer, a mobile computer, a handheld computer, a desktop computer, and/or a wearable computer. The control manager may be executed at an operating system level, and the computing device may be the first device, the second device, or a server.

According to further examples, a control manager module is provided to shift a portion of a user interface from one computing device to another computing device. The control manager module may include an element-selection module, an element-shifting module, and a processing module. The element-selection module may be configured to receive a request to shift a first portion of a first user interface (UI) of a first application from a first device to a second device. The element-shifting module may be configured to cause the second device to display the first portion. The processing module may be configured to cause the first device to display the first UI, generate a second UI including the first UI and an additional content, and cause the first device to display a portion of the second UI, where the portion of the second UI includes the additional content and the first UI but excludes the first portion of the first UI.

According to some embodiments, the element-selection module may be configured to receive the request by receiving a selection of one or more rows, one or more columns, an intersection of one or more rows and columns, and/or multiple pixels on the first UI of the first application corresponding to the first portion. A size of the first UI may be preserved when the portion of the second UI is displayed on the first device. A size of the first UI may also be reduced when the portion of the second UI is displayed on the first device. The element-shifting module may be configured to provide the first portion to the second device in an image format.

According to other embodiments, the processing module may be further configured to capture an input associated with the first portion and convey the captured input to the first application for processing. The first portion of the first UI may include one or more control elements and the captured input may be associated with one of the one or more control elements. The processing module may be further configured to execute a simulated instance of the first application and deliver the captured input as a message to the simulated instance of the first application. The message may be received in a readable stream that emits data events associated with the second device.

According to further embodiments, the processing module may be further configured to implement one or more controls within the first portion as a writeable stream to the second device and a readable stream from an interface object. The element-shifting module may be configured to compose a link for one or more controls on the first UI and provide the link to the second device for displaying the one or more controls as a web page. The link may be provided to the second device via near field communication (NFC) or an optically machine-readable code. The first and second device may be a smartphone, a tablet computer, a laptop computer, a mobile computer, a handheld computer, a desktop computer, and/or a wearable computer. The control manager module may be executed at an operating system level, and may be executed at one of the first device, the second device, or a server.

According to some embodiments, a computer readable medium may store instructions to shift a portion of a user interface from one computing device to another computing device, which when executed on one or more computing devices may execute a method for shifting a portion of a user interface from one computing device to another computing device. The methods may be similar to the methods described above.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the fill scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors.

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It wilt be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to shift a portion of a user interface (UI) from a computing device to another computing device, the method comprising:
   providing to be displayed a first UI of a first application on a first device by:
      determining a display size for the first device,
      generating a simulated instance of the first application based on the determined display size, wherein a size of the simulated instance matches the determined display size,
      selecting content to be included in the simulated instance from content of the first application based on the size of the simulated instance, and
      providing the selected content for display through the first UI;
   receiving a request to shift a first portion of the first UI to a second device, wherein receiving the request includes receiving a selection of a plurality of pixels on the first UI of the first application corresponding to the first portion;
   generating a second UI, the second UI including the first UI and an additional content;
   providing the first portion to be displayed on the second device in an image format;
   regenerating the simulated instance of the first application such that the size of the simulated instance is increased by a size of the first portion to enable display of the additional content of the second UI in available display space of the first UI corresponding to the first portion of the first UI when the first portion of the first UI is removed from the first device; and
   providing a portion of the second UI to be displayed on the first device, wherein the portion of the second UI includes the additional content and the first UI but excludes the first portion of the first UI.

2. The method of claim 1, wherein receiving the request includes receiving a selection of one of: one or more rows, one or more columns, and an intersection of one or more rows and columns.

3. The method of claim 1, wherein providing the portion of the second UI to be displayed on the first device comprises enabling a size of the first UI to be reduced.

4. The method of claim 1, further comprising:
   capturing an input associated with the first portion; and
   conveying the captured input to the first application for processing.

5. The method of claim 4, wherein the first portion of the first UI includes one or more control elements and the captured input is associated with one of the one or more control elements.

6. The method of claim 4, further comprising executing the simulated instance of the first application and delivering the captured input as a message to the simulated instance of the first application.

7. The method of claim 6, further comprising receiving the message in a readable stream that emits data events associated with the second device.

8. The method of claim 1, further comprising implementing one or more controls within the first portion as a writeable stream to the second device and a readable stream from an interface object.

9. The method of claim 1, wherein providing the first portion to be displayed on the second device comprises providing a link to the second device via one of near field communication (NFC) or an optically machine-readable code.

10. The method of claim 1, wherein a control manager to receive the request and generate the second UI is implemented on one of the first device, the second device, and a server communicatively coupled to the first and second devices.

11. A computing apparatus to shift a portion of a user interface (UI) from a computing device to another computing device, the computing apparatus comprising:
    a memory configured to store instructions;
    a communication module; and
    a processor coupled to the memory and the communication module, the processor operable to execute a control manager, wherein the control manager is configured to:
       cause a first device to display a first UI of a first application;
       receive a request to shift a first portion of the first UI to a second device based on a selection of one of: one or more rows, one or more columns, and an intersection of one or more rows and columns, wherein:

a clipping tool is provided to enable selection of the first portion of the first UI to be shifted to the second device, and the clipping tool is configured with an identifier for the first device such that any portion of the first UI that is snipped using the clipping tool is also displayed in a menu of the second device and one or more other devices associated with a user of the first device;

generate a second UI, the second UI including the first UI and an additional content;

cause the second device to display the first portion;

cause the first device to display a portion of the second UI, wherein the portion of the second UI includes the additional content and the first UI but excludes the first portion of the first UI; and compose a link for one or more controls on the first UI and provide the link to the second device to display the one or more controls as a web page.

12. The computing apparatus of claim 11, wherein the control manager is configured to enable a size of the first UI to be reduced when the portion of the second UI is displayed on the first device.

13. The computing apparatus of claim 11, wherein the control manager is further configured to:

capture an input associated with the first portion; and convey the captured input to the first application for processing.

14. The computing apparatus of claim 13, wherein the first portion of the first UI includes one or more control elements and the captured input is associated with one of the one or more controls.

15. The computing apparatus of claim 13, wherein the control manager is further configured to execute a simulated instance of the first application and deliver the captured input as a message to the simulated instance of the first application.

16. The computing apparatus of claim 15, wherein the message is in a readable stream that emits data events associated with the second device.

17. The computing apparatus of claim 11, wherein the control manager is further configured to implement one or more controls within the first portion as a writeable stream to the second device and a readable stream from an interface object.

18. A control manager configured to shift a portion of a user interface (UI) from a computing device to another computing device, the control manager comprising:

a communication interface to facilitate communication among the control manager, a first device, and a second device; and a processor coupled to the communication interface and configured to:

cause the first device to display a first UI of a first application by:

determination of a display size for the first device, generation of a simulated instance of the first application based on the determined display size, wherein a size of the simulated instance matches the determined display size, selection of content to be included in the simulated instance from the content of the first application based on the size of the simulated instance, and provision of the selected content for display through the first UI;

provide a clipping tool to enable selection of a first portion of the first UI to be shifted to the second device, wherein the clipping tool is configured with an identifier for the first device such that any portion of the first UI that is snipped using the clipping tool is also displayed in a menu of the second device and one or more other devices associated with a user of the first device;

receive a request to shift the first portion of the first UI from the first device to the second device based on a selection through the clipping tool of one of: one or more rows, one or more columns, and an intersection of one or more rows and columns, wherein the request includes a selection of a plurality of pixels on the first UI of the first application corresponding to the first portion;

generate a second UI, the second UI including the first UI and an additional content;

cause the second device to display the first portion;

regenerate the simulated instance of the first application such that the size of the simulated instance is increased by a size of the first portion to enable display of the additional content of the second UI in available display space of the first UI corresponding to the first portion of the first UI when the first portion of the first UI is removed from the first device; and cause the first device to display a portion of the second UI, wherein the portion of the second UI includes the additional content and the first UI but excludes the first portion of the first UI.

19. The control manager of claim 18, wherein the processor is configured to enable a size of the first UI to be reduced when the portion of the second UI is displayed on the first device.

20. The control manager of claim 18, wherein the processor is further configured to:

capture an input associated with the first portion; and convey the captured input to the first application for processing.

21. The control manager of claim 20, wherein the first portion of the first UI includes one or more control elements and the captured input is associated with one of the one or more controls.

22. The control manager of claim 20, wherein the processor is further configured to execute the simulated instance of the first application and deliver the captured input as a message to the simulated instance of the first application.

23. The control manager of claim 22, wherein the message is in a readable stream that emits data events associated with the second device.

* * * * *

UNITED STATES PATENT AND TRADEMARK OFFICE
CERTIFICATE OF CORRECTION

PATENT NO. : 9,602,576 B2  Page 1 of 1
APPLICATION NO. : 14/350038
DATED : March 21, 2017
INVENTOR(S) : Kruglick It is certified that error appears in the above-identified patent and that said Letters Patent is hereby corrected as shown below:

In the Specification

In Column 1, Line 8, delete "§371" and insert -- § 371 --, therefor.

In Column 4, Line 48, delete "second element 206," and insert -- second UI element 206, --, therefor.

In Column 8, Line 19, delete "and/o controls" and insert -- and/or controls --, therefor.

In Column 9, Line 62, delete "devices e.g.," and insert -- devices (e.g., --, therefor.

In Column 13, Line 48, delete "smartphone, tablet" and insert -- smartphone, a tablet --, therefor.

In Column 15, Line 38, delete "fill scope" and insert -- full scope --, therefor.

In Column 16, Line 45, delete "claims e.g.," and insert -- claims (e.g., --, therefor.

In Column 16, Line 50, delete "It wilt be" and insert -- It will be --, therefor.

Signed and Sealed this
Twenty-fifth Day of July, 2017

Joseph Matal
*Performing the Functions and Duties of the
Under Secretary of Commerce for Intellectual Property and
Director of the United States Patent and Trademark Office*